United States Patent [19]

Willard

[11] Patent Number: 5,311,108

[45] Date of Patent: May 10, 1994

[54] CONTROL SYSTEM FOR UNIDIRECTIONAL MOTOR HAVING IMPROVED DYNAMIC BRAKING

[75] Inventor: Frank G. Willard, Oakmont, Pa.

[73] Assignee: Cleaveland/Price, Inc., Trafford, Pa.

[21] Appl. No.: 76,439

[22] Filed: Jun. 11, 1993

[51] Int. Cl.$^5$ ............................................... H02P 3/12
[52] U.S. Cl. ................................... 318/381; 318/246; 318/251
[58] Field of Search .................... 318/362, 375–381, 318/757–762, 703, 86–87, 244, 245, 248–251

[56] References Cited

U.S. PATENT DOCUMENTS

| | | |
|---|---|---|
| 2,575,021 | 11/1951 | Leitch et al. |
| 3,260,908 | 7/1966 | Bostwick |
| 3,463,991 | 8/1969 | Yuminaka et al. |
| 3,628,112 | 12/1971 | Gross ............................ 318/369 X |
| 3,792,330 | 2/1974 | Ottoson ............................ 318/375 |
| 3,851,233 | 11/1974 | Sherman ........................ 318/375 X |
| 3,872,363 | 3/1975 | Gross ............................ 318/377 X |
| 4,166,240 | 8/1979 | Russell ............................ 318/380 |
| 4,386,299 | 5/1983 | Pham ............................ 318/375 |
| 4,554,999 | 11/1985 | Kamaike ........................ 318/376 X |
| 5,184,049 | 2/1993 | Kuichi |
| 5,189,360 | 2/1993 | Schwartz et al. ................ 318/382 X |

OTHER PUBLICATIONS

Standard Handbook for Electrical Engs. McGraw-Hill, Sec. 1.5–4.64 pp. 1304–1305 Machine Design, Jun. 1992, p. 484.

*Primary Examiner*—William M. Shoop, Jr.
*Assistant Examiner*—David Martin
*Attorney, Agent, or Firm*—W. D. Palmer

[57] ABSTRACT

Motor control system for unidirectional series DC electric motor having improved dynamic braking performance for smoothly, rapidly and predictably stopping the motor armature so that any operated devices are similarly stopped at a predetermined location. The control system uses a bridge conformed like a full-wave rectifier together with a pair of switches having open and closed positions to control the direction of current through the armature. The current through the motor field winding is always in the same direction. The control switches are protected against arcing when breaking an inductive load.

6 Claims, 4 Drawing Sheets

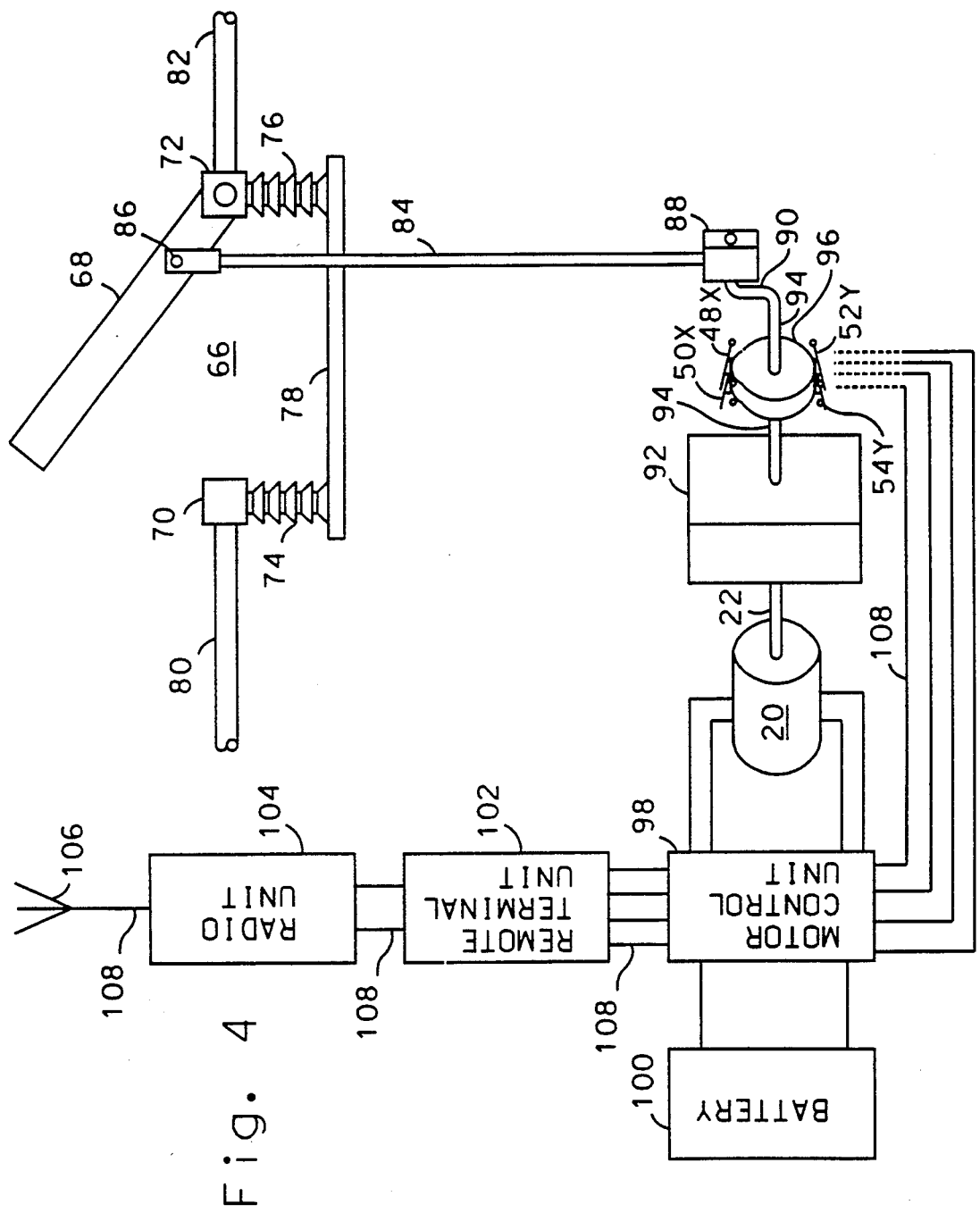

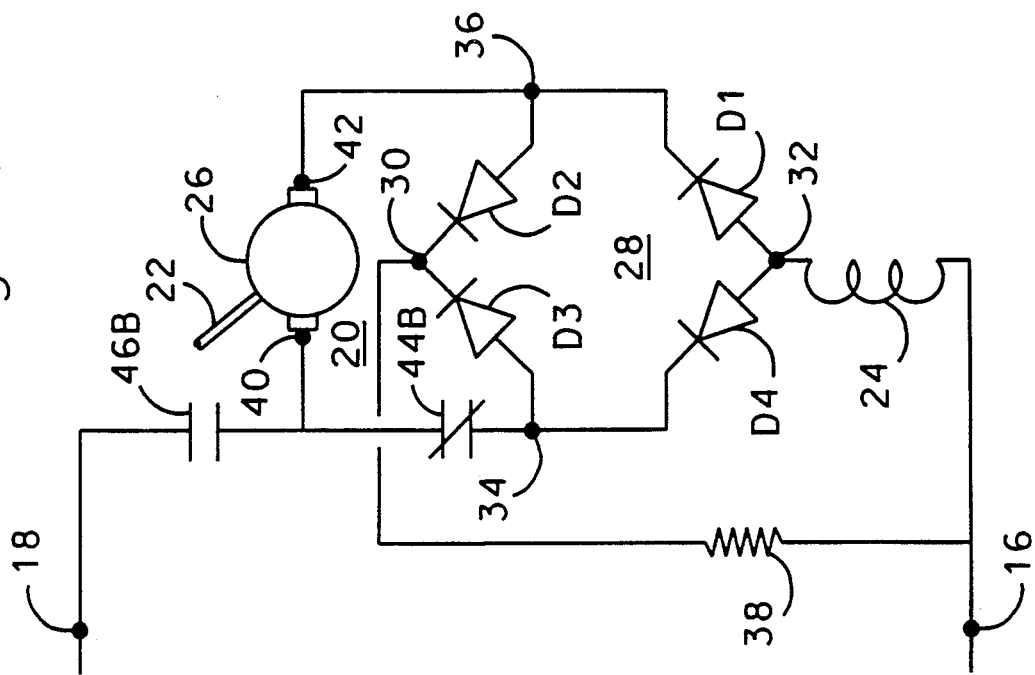
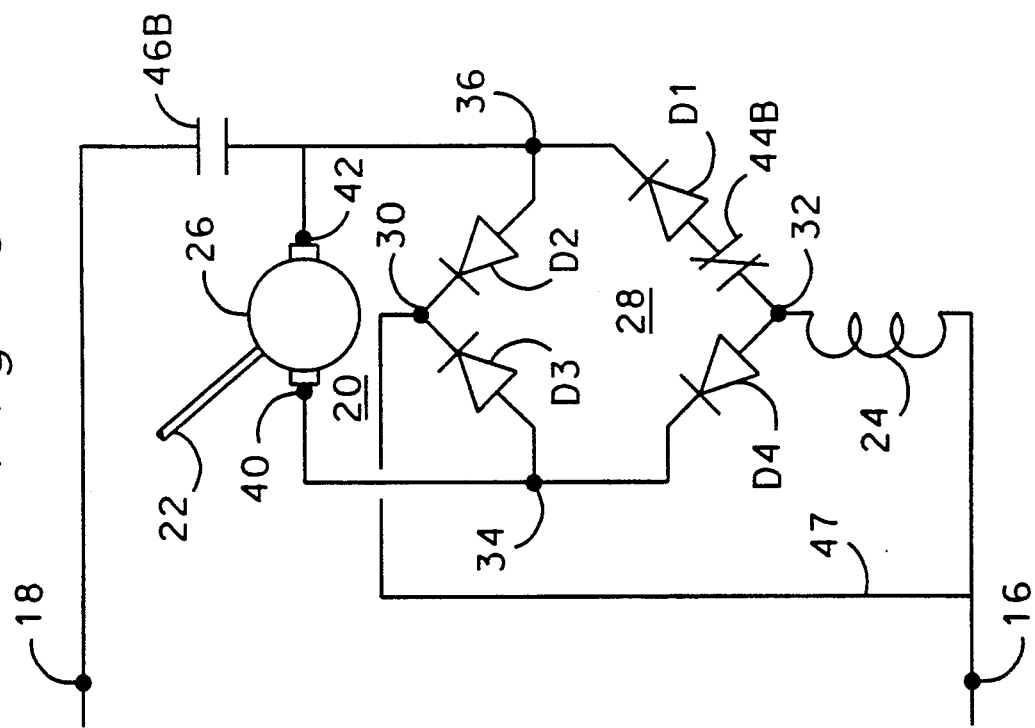

CONTROL SYSTEM FOR UNIDIRECTIONAL MOTOR HAVING IMPROVED DYNAMIC BRAKING

CROSS-REFERENCE TO RELATED APPLICATION

In copending U.S. application Ser. No. 08/076,433, filed concurrently herewith by the present inventor and owned by the present assignee is disclosed an improved dynamic braking system for a reversible motor.

BACKGROUND OF THE INVENTION

1. Field of the Invention

This invention relates to control systems for motors and, more particularly, to a motor control system for a unidirectional motor having improved motor dynamic braking.

2. Description of the Prior Art

Dynamic braking for electric motors has been in widespread use for over eighty years. The 1915 Edition of the Standard Handbook for Electrical Engineers, McGraw-Hill Sec. 15,-464, pages 1304–05 defines dynamic braking as follows: "... the retardation of a machine by a motor acting as a generator. The subject of dynamic braking may be divided into two parts as follows: first, for the purpose of effecting a quick stop; second, for the retardation of a descending load."

Recently, an article in Machine Design, June, 1992 at page 484 notes that: "Dynamic braking of dc motors occurs when the armature terminals are disconnected from the power supply and then connected together, while the field is energized. The resultant armature current from the counter-emt voltage creates a magnetic field that opposes motor rotation."

In a field as old and commercial as dynamic braking of electric motors, the patent and technical literature is replete with examples of improvements. For example, U.S. Pat. No. 5,184,049 dated Feb. 2, 1993 to Kiuchi utilizes a switching mechanism for short-circuiting the power terminals of the stator windings of a three-phase motor once a brake signal is issued from the brake circuit. This rapidly brings the motor to a full stop. U.S. Pat. No. 3,260,908 dated Jul. 12, 1966 to Bostwick arrests the rotation of an AC motor by reversing the motor armature connections through an elaborate circuit to effect braking. U.S. Pat. No. 3,463,991 dated Aug. 26, 1969 to Yuminaka et. al. utilizes a rectifier bridge and a single SCR switch to effect braking of a motor. U.S. Pat. No. 2,575,021 dated Nov. 13, 1951 to Leitch et. al. describes a fairly complicated system in which motor field connections are reversed to obtain braking.

All of the commercial systems for dynamic braking tried to date have drawbacks, some of which are a lock of consistent operation and reliability and problems encountered with residual fields and delays in motor response and thus braking response. For some applications very reliable and consistent operation is a requirement and a typical example for such an application is a remote switch for a high-voltage circuit.

SUMMARY OF THE INVENTION

There is provided a motor control system for a unidirectional series DC motor which has an output shaft. When energized the output shaft is rotated and when energization is removed, the output shaft and any driven member are smoothly and rapidly and predictably stopped. The system operates from a DC source having output terminals and has connected thereto a bridge circuit conformed as a full-wave rectifier and having DC terminals of different polarities and AC terminals. A motor field winding forms an integral part of the motor and is electrically connected between one output terminal of the DC source and the one DC terminal of the full-wave rectifier bridge which has a polarity different from the polarity of the one terminal of the DC source. The other DC terminal of the bridge connects to the one output terminals of the DC source.

A rotatable motor armature having two electric terminals forms an integral part of the series DC motor and connects to an output shaft to rotate same. One electrical terminal of the motor armature is adapted to be connected via one AC terminal of the bridge to that bridge DC terminal of differing polarity. The other electric terminal of the motor armature is adapted to be connected via the other AC terminal of the bridge to that DC terminal of differing polarity. A first controllable open or closed operating switch is positioned in circuit between one of the armature terminals and that bridge DC terminal of differing polarity. A second controllable open or closed operating switch is positioned in circuit between the other of the armature terminals and the other terminal of the DC source. The first operating switch and the second operating switch are both adapted to be connected to the same electrical terminal of the motor armature.

Means for controlling the open and closed positions of the operating switches provide the following functions: when the first switch is open and the second switch is closed, the armature and output shaft rotate in a predetermined direction. When the first switch is closed and the second switch is opened with the armature and output shaft turning, any rotation of the armature and output shaft is smoothly and rapidly braked.

BRIEF DESCRIPTION OF THE DRAWINGS

For a better understanding of the invention, reference should be made to the accompanying drawings wherein:

FIG. 4 is an elevational view of a motor driven apparatus which typically comprises a switch contact for a remote controlled high-voltage switching device; and FIGS. 5 and 6 are alternative schematic views wherein the positioning of one operating switch with respect to the bridge is changes as is the position of the operating switch which is located between a motor armature terminal and the other DC source terminal.

DESCRIPTION OF THE PREFERRED EMBODIMENTS

Figure 1:
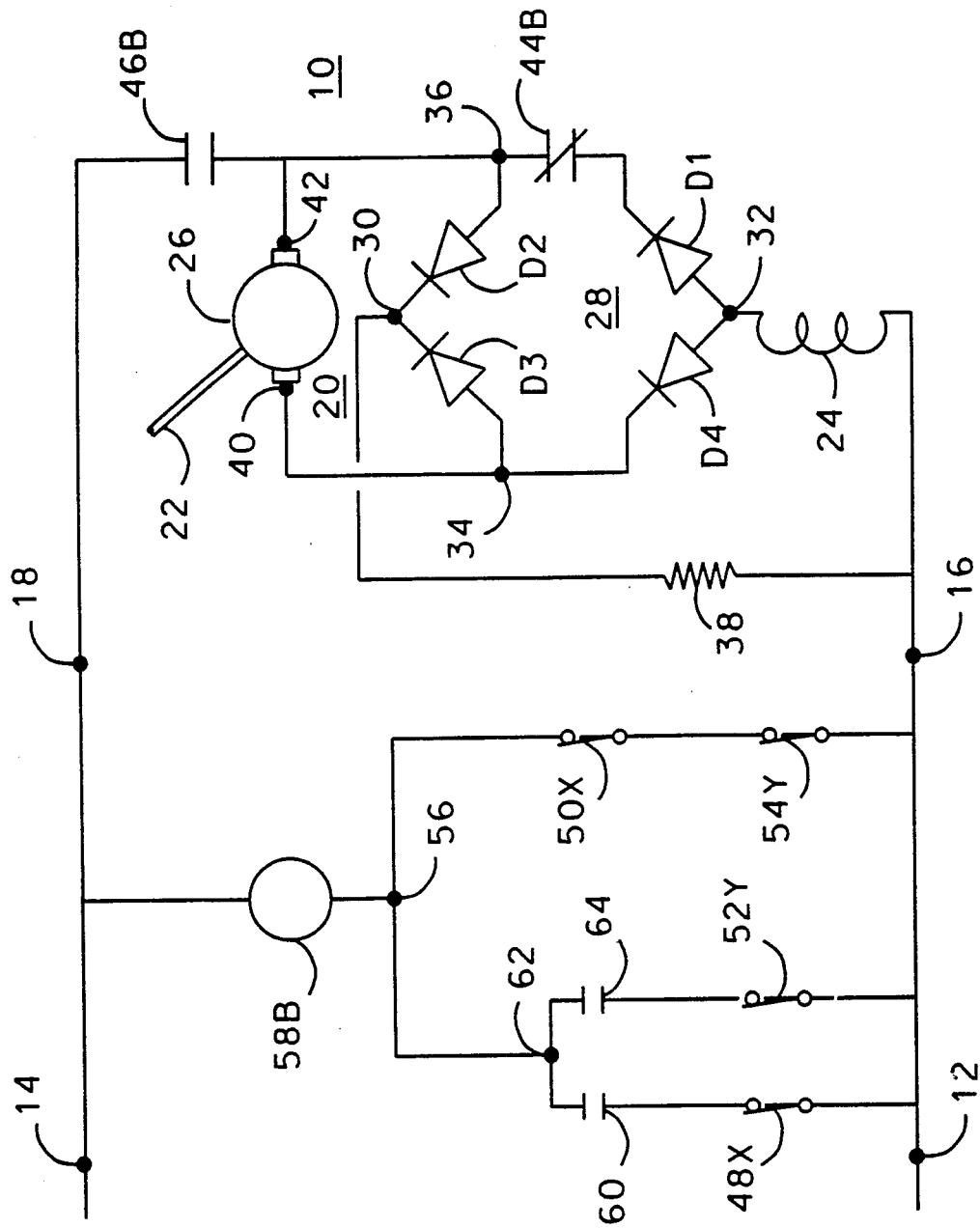
FIG. 1 is a circuit diagram of the present braking system together with additional circuit elements which are used for one specific practical application of the present braking system.

In FIG. 1, the motor control system 10 is adapted to be connected across the terminals 12 and 14 of a DC supply bus. For purposes of this description, additional terminals 16 and 18 are shown and the primary system components as connected across these terminals 16, 18 will be described first. The control system 10 is designed for use with a unidirectional series DC motor 20 having a rotatable output shaft 22, shown schematically in this figure, and which is connected to a driven member to be described hereinafter.

The motor 20 includes a field winding 24 and a rotatable armature 26 which connects to and drives the output shaft 22. A diode bridge circuit 28 which is conformed as a full-wave rectifier comprises the diodes D1, D2, D3 and D4. The bridge has one DC terminal 30, usually marked (+), and one DC terminal 32, usually marked (−), and AC terminals 34 and 36. The motor field winding 24 connects between the DC source terminals 16 and the DC terminal 32 of the bridge which has a polarity opposite to the polarity of the DC terminal 16. The terminal 30 of the bridge 28 connects to the DC terminal 16 via a braking resistor 38, described hereinafter.

The rotatable motor armature 26 has two electric terminals 40 and 42. One armature terminal 40 is electrically connected to the bridge terminal 32 via one of the bridge AC terminals 34. The other armature terminal 42 is electrically connected to the bridge terminal 32 via the other bridge AC terminal 36. In the embodiment of FIG. 1, a first controllable open or closed switch 44B is positioned in circuit between the AC terminal 36 and the diode D1. The switch is shown in its unenergized normal closed position. A second controllable open or closed operating switch 46B is positioned in circuit between the motor armature terminal 42 and the other terminal 18 of the DC source. This switch is shown in its normal unenergized open position. When the switches 44B and 46B are energized they both will move to opposite positions from those shown in FIG. 1. The circuits for controlling the opening and closing of the switches will be described hereinafter.

Figure 2:
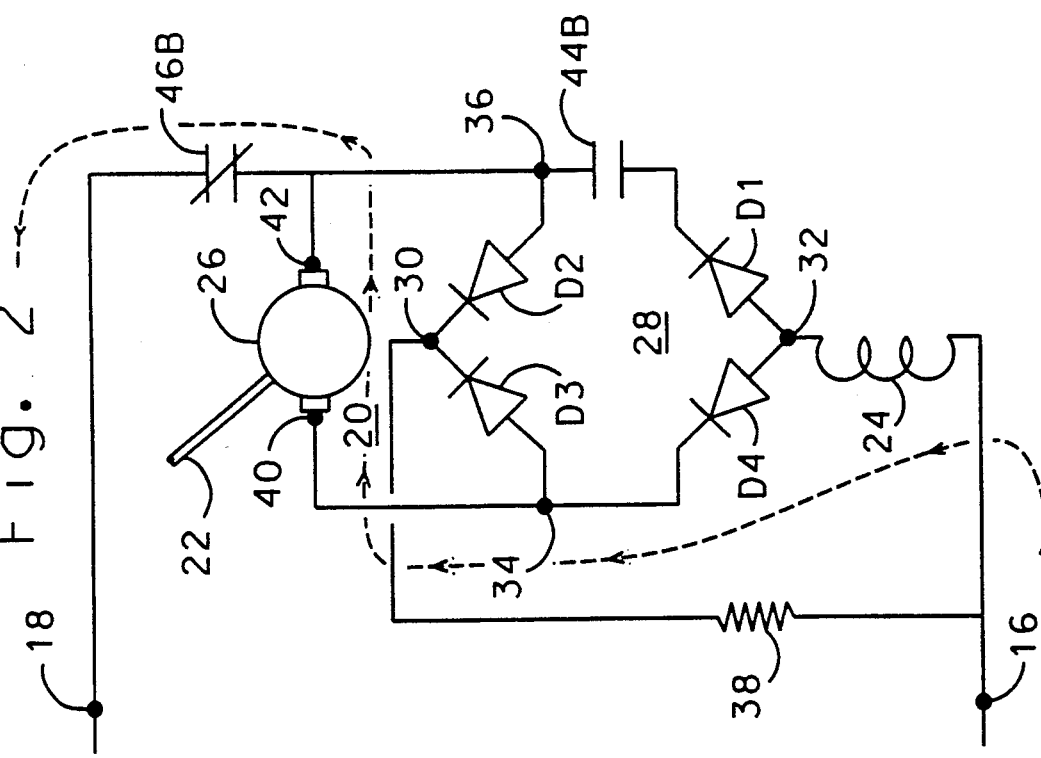
FIG. 2 is a schematic view of the system as operated wherein the first operating switch is energized to an open state and the second operating switch is energized to a closed state with the motor armature and the output shaft rotating.

In FIG. 2 is shown the motor 20 in operation which rotates the armature 26 and output shaft 22. This is achieved by energizing the switch 44B to an open position and the switch 46B to a closed position. The resulting current flow is from the terminal 16, through the field winding 24, to diode D4, to armature terminal 40 and through the armature 26, through the closed switch 46B and thence to the DC terminal 18. The current path is shown in broken lines.

Figure 3:
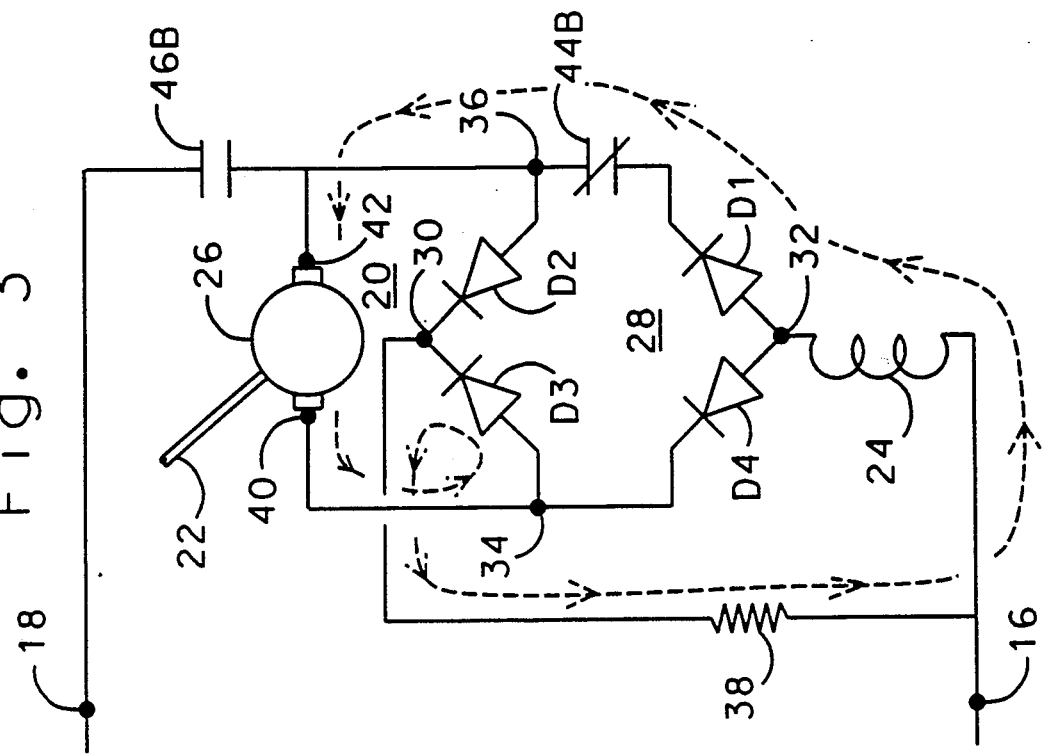
FIG. 3 is a schematic view of the system immediately after deenergization with the first operating switch closed and the second operating switch open, and with the armature and output shaft will rotating and in the process of being dynamically braked.

When the system is de-energized, the switch 46B opens and the switch 44B closes, as shown in FIG. 3. The armature 26 and output shaft 22 are still rotating and depending on the application, the inertial energy can be substantial. The armature current immediately reserves due to the counter-emf voltage to create a magnetic field that opposes armature rotation. The reverse current is shown in broken lines in FIG. 3 and proceeds through the field winding 24, the diode D1, the closed switch 44B, the armature terminal 42, the armature 26, to the AC terminal 34 of the bridge 28, through the diode D3, to the braking resistor 38 and thence to the motor field winding 24.

The larger the value of the braking resistor 38, the smaller the reverse current and the less aggressive the braking. For some applications, the braking resistor 38 can be replaced by a straight wire and such an embodiment is shown in FIG. 5 wherein a wire 47 directly connects terminal 30 to terminal 16.

When the switch 46B is opened, this interrupts an inductive load as represented by the field winding 24 and the armature 26. In the milliseconds or so that it takes the switch 46B to open, there can be generated at the switch contacts a substantial indicative surge. Without some sort of protection this can lead to burning or even ultimate welding of the switch contacts. In the circuit as shown in FIG. 3, the diode D2 acts to direct any inductive surge to the braking resistor 238.

Referring again the FIG. 1, the components used to apply the basic braking circuit to a practical application are shown as bounded by the terminals 12, 14 16 and 18. There are provided a first pair of limit switches 48X and 50X and a second pair of limit switches 52Y and 54Y. Each pair of these switches is normally closed and are actuated by movement of a driven cam to an open position. As shown in FIG. 1, one switch 50X of the first switch pair of one switch 54Y of the second switch pair are connected in series between one output terminal 16 of the DC source and a junction terminal 56. A relay coil means 58B connects between the junction terminal 56 and the other DC terminal 14. This coil when energized actuates the controlling switches 44B and 46B.

The other switch 48X of the first switch pair connects in series with a first actuating switch 60 that is operable to be closed for a short period of time, such as a push button switch. The series-connected first limit switch member 48X and first actuating switch 60 connect between the DC source terminal 12 and a second junction terminal 62. The other limit switch 52Y of the second switch pair connects in series with a second actuating switch 64 and the series-connected limit switch 52Y and actuating switch 64 connect between the terminal 12 and the second junction terminal 62. The second junction terminal 62 connects to the first junction terminal 56.

As described in greater detail hereinafter, closure of either of the switches 60 and 64 for a short period of time operates to actuate the relay coil 58B which energizes the control switches 44B and 46B. Once energized, the coil 58B remains energized until one pair of the limit switches 48X, 50X or 52Y, 54Y is opened to open the circuit to the coil 58B and de-energize same and the switches 44B and 46B it controls.

Turning now to FIG. 4, there is shown a generally schematic view of a remote-controlled high-voltage switching device 66 which can be mounted near the top of a wooden pole. The usual practice is to employ three sets of these devices, one for each of three phases of a high-voltage AC power transmission lines, For clarity, only a single phase is shown. The switching device 66 comprises a moving metal contact blade 68, a fixed contact 70, bearing contacts 72, supporting insulators 74, 76 and a rigid frame member 78. The switch contacts 70 and 72 are electrically connected to different segments 80 and 82 of a high-voltage power line.

The contact blade 68 is actuated by an insulated, actuating rod 84 which attaches to the blade 68 by a hinged connection 86. The other end of the rod 84 connects through a bearing block 88 to a crank 90. A gearbox 92 interconnects the drive shaft 94 with the output shaft 22 of motor 20. A cam 96 is affixed to the shaft 94 and actuates the limit switches 48X, 50X or 52Y, 54Y when a predetermined positioning of the switch blade 68 has been achieved, that is, fully open or fully closed.

Operation of the motor 20 is by the control circuitry 98, as shown in detail in FIG. 1 and the primary power supply is by battery 100 which can float on stepped down and rectified power from the power line. A communications device, typically termed a "Remote Terminal Unit" 102 cooperates with a radio unit 104 and its antenna 106 to provide remote control for the high-voltage switch operation. The electrical interconnections 108 for the foregoing units are shown schematically. The unit is normally provided with a weather-proof casing which may contain heater elements, as required. To operate a typical unit as shown in FIG. 4, the motor can be rated at about one horsepower and the diode bridge 28 is rates at 4-amp. 600 volts. The control switches 44B and 46B are rated to carry ten amperes.

By way of further explanation, in their normal unenergized state, one of the limit switches is open, for example the pair 48X, 50X which can be maintained open by the position of the cam 96. In such a case, to operate the circuit breaker, further rotation of the unidirectional motor 20 is required first to close these limit switches 48X, 50X. This is achieved by closing the momentary contact switch 64 (see FIG. 1) which actuates the coil 58 and the control circuitry. Operation of the motor 20 continues until the limit switches 52Y, 54Y are opened by the action of the cam 96. This corresponds to a predetermined positioning of the blade 68, such as fully closed. To open the device, the switch 60 is closed for a short period sufficient to close all limit switches and the motor continues operation until the limit switches 48X, 50X are again opened. In an application such as the foregoing, the dynamic braking of the device 66 is very smooth, rapid and consistent, even through the heavy moving switch blades, motors and gears have considerable inertial energy.

In FIGS. 5 and 6 are shown alternative embodiments wherein the control switches are placed in different positions. For example, in the embodiment shown in FIG. 5, the control switch 44B has been moved to a position intermediate the diode D1 and the terminal 32, with other elements remaining in the same position. In the embodiment as shown in FIG. 6, the control switch 46B is positioned between the armature terminal 40 and the DC source terminal 18. Also, the control switch 44B is positioned between the bridge AC terminal 34 and the armature terminal 40. With such an embodiment, an additional diode may be used to minimize arcing when the control switch 46B opens.

In the foregoing description, it will be understood that specified polarities and current flows have been set forth for clarity of explanation. These may be reversed without harming operation of the system.

The simplicity of the present circuit and resulting low-cost structure makes it particularly desirable for use with smaller, low-power applications. However, this does not limit its use in any type of dynamic braking application.

I claim as my invention:

1. A motor control system for a unidirectional series DC electric motor, said motor having an output shaft, and said system when energized operable to rotate said output shaft and to smoothly and rapidly stop rotation of said output shaft when energization is removed, said control system comprising:

a DC source having output terminals of predetermined polarities;

a motor field winding forming an integral part of said series DC motor, a bridge circuit conformed as a full-wave rectifier and having DC terminals of different polarities and AC terminals, said motor field winding electrically connecting between one output terminal of said DC source and the one DC terminal of said full-wave rectifier bridge which has a polarity different from the polarity of said one output terminal of said DC source, and the other DC terminal of said full-wave rectifier bridge connecting to said one output terminal of said DC source;

a rotatable motor armature having two electric terminals and forming an integral part of said series DC motor, said motor armature connecting to and operable to rotate said output shaft, one electric terminal of said motor armature adapted to be connected via one AC terminal of said bridge to said one DC terminal of said bridge, the other electric terminal of said motor armature adapted to be connected via the other AC terminal of said bridge to said one DC terminal of said bridge, a first controllable open or closed operating switch positioned in circuit between one of said motor armature terminals and said one DC terminal of said bridge, a second controllable open or closed operating switch positioned in circuit between one of said motor armature terminals and said other terminal of said DC source, and said first operating switch and said second operating switch both connecting to the same electrical terminal of said motor armature; and means for controlling the open and closed positions of said operating switches to achieve the following system functions: when said first operating switch is opened and said second operating switch is closed, said armature and output shaft rotate in a predetermined direction, and when said first operating switch is closed and said second operating switch is opened with said armature and output shaft turning, the rotation of said armature and output shaft are smoothly and rapidly dynamically braked.

2. The motor control system as specified in claim 1, wherein said first open or closed operating switch is connected in circuit between said one AC terminal of said bridge and said one DC terminal of said bridge.

3. The motor control system as specified in claim 1, wherein said first open or closed operating switch is connected in circuit between said other AC terminal of said bridge and said one DC terminal of said bridge.

4. The motor control system as specified in claim 1, wherein said first operating switch is normally closed and is operable to be actuated to an open position, and said second operating switch is normally open and is operable to be actuated to a closed position.

5. The motor control system as specified in claim 1, wherein a braking resistor connects between said other terminal of said motor armature and said one DC terminal of said DC source, and the larger the value of said braking resistor, the slower the dynamic braking of said system.

6. The motor control system as specified in claim 1, wherein said motor output shaft connects to and moves an actuating cam and a driven member, a first pair of normally closed cam-actuated limit switches and a second pair of normally closed cam-actuated limit switches, rotation of said motor output shaft moving said actuating cam and said driven member, after said driven member has moved a first predetermined amount said actuating cam acting to open said first pair of normally closed limit switches, and after said driven member has moved a second predetermined amount said actuating cam acting to open said second pair of normally closed limit switches;

one of said first pair of limit switches and one of said second pair of limit switches connected in series between said one output terminal of said DC source and a first junction terminal, and a relay coil means connecting between said other terminal of said DC source and said first junction terminal and operating to control the opening and closing of said first operating switch and said second operating switch;

the other of said first limit switches connected in series with a first actuating switch which is operable to be closed for a short period of time; said series-connected other first limit switch and said first actuating switch connected between a second junction terminal and said one output terminal of said DC source, the other of said second limit switches connected in series with a second actuating switch is operable to be closed for a short period of time; said series-connected other second limit switch and said second actuating switch connected between said second junction terminal and said one output terminal of said DC source; and said second junction terminal connected to said first junction terminal; and closure of either of said actuating switches for a short period of time energizing said relay coil means to actuate said operating switches to rotate said motor armature and output shaft and move said actuating cam and said driven member a predetermined amount sufficient to open one pair of said limit switches which deenergizes said relay coil means and removes energization from said motor and dynamically brakes said output shaft and said driven member.

* * * * *